April 6, 1965 R. McFADYEN ETAL 3,176,951

TELEPHONE DIALING PENCIL HOLDER

Filed Sept. 12, 1962

INVENTORS
RICHARD McFADYEN
JAMES M. BOSLAND

BY Darby + Darby
ATTORNEYS

United States Patent Office 3,176,951

Patented Apr. 6, 1965

3,176,951

TELEPHONE DIALING PENCIL HOLDER

Richard McFadyen, Upper Montclair, and James M. Bosland, Wayne, N.J., assignors to Ketcham and McDougall, Inc., Roseland, N.Y., a corporation of New Jersey Filed Sept. 12, 1962, Ser. No. 223,200
2 Claims. (Cl. 248—227)

The present invention relates to telephone accessories and particularly to a device for removably mounting a dialing pencil on a telephone base in position where it may be readily removed, utilized in dialing and replaced.

More particularly the invention comprises a clip element made of resilient material which is removably fixed to the telephone and which is so formed that it retains the rotatable ball shaped end of a dialing instrument which may, for example, be a pencil. The clip is so shaped that the dialing instrument may readily be removed and utilized for its intended purpose and may thereafter be quickly and readily replaced in the holder and thus always be available for use.

It is an object of the invention to provide a holder readily attachable to the ordinary telephone base and so positioned that elements of the holder extend into position adjacent the dial and retain a dialing instrument.

It is a further object of the invention to provide such a holder which is in the form of a resilient clip and is capable of use with either of the two telephone bases currently in general use.

It is a further object of the invention to provide such a dialing instrument holder which is so formed as to retain a ball ended dialing instrument in position adjacent the telephone dial in a manner such that it is readily removed and reinserted in the holder.

It is a still further object of the invention to provide such a spring clip dialing holder which is simple in construction and economically manufactured.

Figure 1:
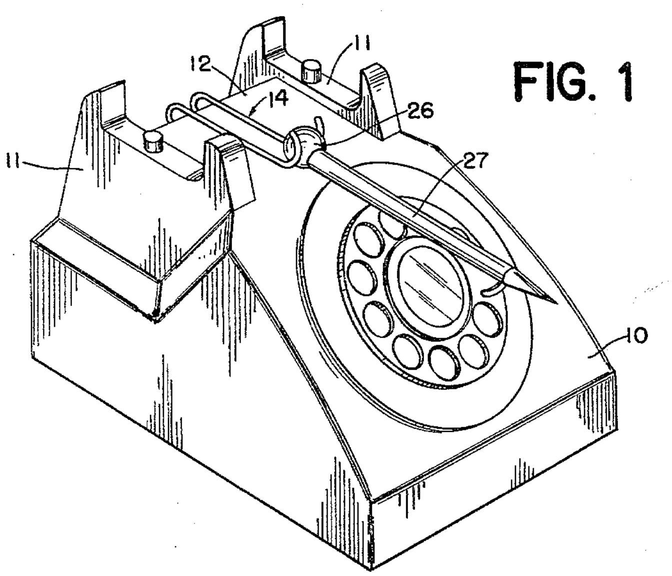
Figure 2:
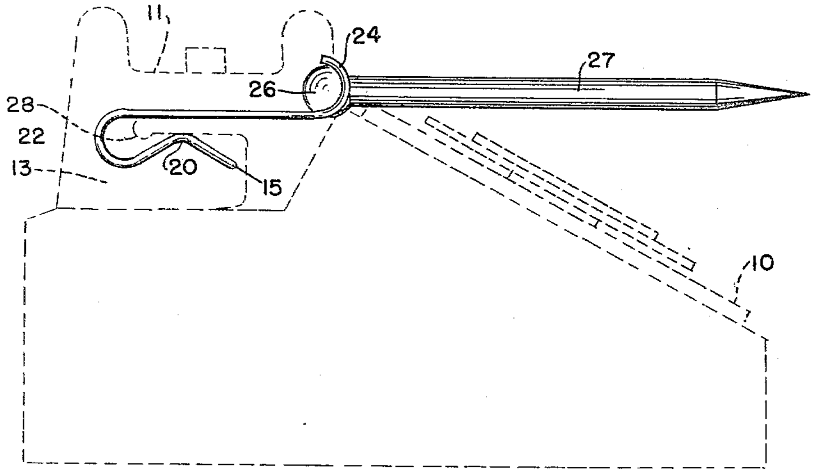
Figure 3:
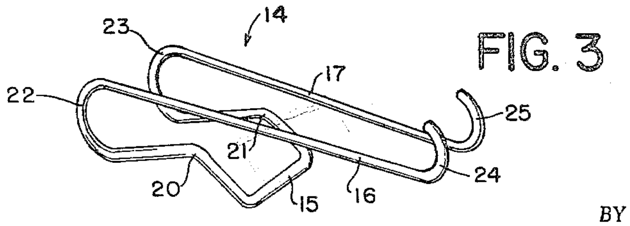

Other objects and features of the invention will be apparent when the following description is considered in connection with the annexed drawings, in which, FIGURE 1 is a perspective view of a telephone handset base showing the dialing implement holder of our invention in position with a dialing implement, in this instance a pencil, mounted therein;

FIGURE 2 is a side elevational view of the telephone base and dialing implement holder showing particularly the manner in which the implement holder is clipped to the lifting edge portion of the phone base; and FIGURE 3 is a perspective view of the dialing implement holder of our invention.

Referring now to the drawings, there is shown at 10 the usual base or stand for a telephone handset not shown. This base is provided with the cradle members 11 between which extends a ledge 12 leaving a space 13 (FIG. 2) between the cradle elements which is provided primarily to permit ready access of the fingers beneath the ledge 12 for lifting and moving the telephone from place to place.

Although there are two types of telephone base in general use, these two types differ only in minor variations in the thickness of the ledge member 12 and therefore the dialing implement holder of our invention is readily utilized with both forms.

As has been indicated, the clip of this invention comprises a piece of spring wire which is bent into a clip formation as seen in FIGURE 3. The clip 14 is formed of a length of spring wire which is first formed into a U shape, the U having a base 15 and arms 16 and 17 extending therefrom. Arms 16 and 17 are bent to form angles 20 and 21 and then a 180° bend is formed in each of the arms 16 and 17 as indicated at 22 and 23 respectively.

The arms 16, 17 are bent at their ends into generally hooked shaped elements 24 and 25 respectively which elements are spaced a slightly lesser distance apart than the dimension of the base 15 of the U. Particularly the spacing between hook elements 24 and 25 is less than the diameter of the usual rotatable ball member such as 26 which is rotatably mounted on a dialing instrument such as the pencil 26, FIG. 1.

It will be clear, therefore, that the dialing pencil may be removed from the clip by merely pulling thereupon thus causing the hook elements 24 and 25 to spread apart and release the ball 26. It will likewise be clear that the pencil may be replaced in position in the hooks by laying it on the straight portions of the arms 16 and 17 behind the hook elements 24 and 25 and moving it forwardly so that it again rests in the hooks as shown in FIGURES 1 and 2.

The clip 14 is of course installed upon the telephone by forcing the clip 14 into position on the ledge 12 as shown in FIGURE 2, the apices of the angles 20 and 21 being caused by the thickened rear portion 28 of the ledge 12 to move downwardly with respect to the straight portions of the wire arms 16 and 17 and to then spring upwardly bearing against the bottom of the ledge 12 and holding the clip firmly in position.

It is of course intended that the clip 14 be semi-permanently installed there being no necessity for removing the clip except when it is to be transferred from one telephone to another. In this connection it will be noted that the arms 16 and 17 of the clip lie on the upper surface of the ledge portion 12 of the telephone stand and do not interfere with a handset which is placed in the cradle elements 11.

While we have described a preferred embodiment of our invention, it will be understood that we wish to be limited not by the foregoing description, but solely by the claims granted to us.

What is claimed is:

1. A device for holding a dialing instrument having a rotatably mounted ball end on a telephone base of the type having a hand-set cradle and a lifting ledge, said device comprising a resilient clip having two identical generally parallel portions, said portions being joined together at one end, each portion having an upwardly extending hook at the end remote from said joined end, the portions adjacent said hooks inclining towards each other to space said hooks slightly less widely than the remaining generally parallel portions, a downwardly extending reverse bend located intermediate said joined end and said hook and an upwardly extending angular portion intermediate said joined end and said reverse bend, said angular portion forming a restricted passageway adapted to cooperate with the lifting ledge to position the device on the telephone base with the hooks extending forwardly so that a dialing instrument resting therein will be supported on the telephone dial structure.

2. A device for holding a dialing instrument having a rotatably mounted ball end on a telephone base of the type having a hand set cradle with a horizontal lifting ledge thereunder, comprising, a resilient clip formed from a single piece of wire bent into a U shape, each of the two arms of said U being bent into a substantially semicircular form at its end to form a hook, said bends being in planes at right angles to the base of said U and extending upwardly as respects the lifting ledge, each arm of said U being bent at points spaced from the hook ends through substantially 180° in planes perpendicular to the base of the U to form a clip-like member, said last mentioned bends being in a direction downwardly with respect to the lifting ledge, said arms of said U between the hook ends and the 180° bends being bent inwardly toward each other to space said hook ends apart a distance slightly less than the diameter of the ball end of the dialing instrument whereby said dialing instrument may be placed in said hook ends by placing it on said arms and moving it into said hooks and may be removed from said hook ends by exerting pressure of the ball end against said hook members to spread said hook members and permit passage of said ball end, the portions of said arms between said base of said U and said 180° bends being bent into an angular formation, the apices of said angles lying closely adjacent to the unbent portions of the arms between the hook ends and said 180° bends, said angular portions forming a restricted passageway into which the edge of the lifting ledge portion may pass to thereby retain the clip on the ledge.

References Cited by the Examiner

UNITED STATES PATENTS

| | | | |
|---|---|---|---|
| 2,135,255 | 11/38 | Johnson | 24—84 |
| 2,307,752 | 1/43 | Anderson | 248—360 X |
| 2,765,509 | 10/56 | Brehm | 24—10 |
| 2,907,085 | 10/59 | Bosland | 248—360 X |

FOREIGN PATENTS

| | | |
|---|---|---|
| 542,121 | 1956 | Italy. |

CLAUDE A. LE ROY, *Primary Examiner.*

FRANK L. ABBOTT, *Examiner.*